United States Patent
Ramos et al.

(10) Patent No.: US 11,308,438 B2
(45) Date of Patent: Apr. 19, 2022

(54) SYSTEM AND METHOD FOR USER TO ORDER ITEMS FOR DELIVERY DURING TRAVEL EVENT

(71) Applicants: Rafael Ramos, Claremont, CA (US); Steve Ramos, Fontana, CA (US)

(72) Inventors: Rafael Ramos, Claremont, CA (US); Steve Ramos, Fontana, CA (US)

(*) Notice: Subject to any disclaimer, the term of this patent is extended or adjusted under 35 U.S.C. 154(b) by 0 days.

(21) Appl. No.: 16/862,387

(22) Filed: Apr. 29, 2020

(65) Prior Publication Data
US 2020/0258037 A1 Aug. 13, 2020

Related U.S. Application Data

(63) Continuation-in-part of application No. 16/033,627, filed on Jul. 12, 2018, now abandoned.

(51) Int. Cl.
G06Q 10/08 (2012.01)
G06Q 30/06 (2012.01)

(52) U.S. Cl.
CPC ..... *G06Q 10/0832* (2013.01); *G06Q 10/0835* (2013.01); *G06Q 30/0637* (2013.01); *G06Q 30/0641* (2013.01)

(58) Field of Classification Search
CPC .......... G06Q 10/0832; G06Q 10/0835; G06Q 30/0637; G06Q 30/0641
USPC ...................................................... 705/26.8
See application file for complete search history.

(56) References Cited

U.S. PATENT DOCUMENTS

| | | | |
|---|---|---|---|
| 7,233,914 B1 | 6/2007 | Wijaya et al. | |
| 8,719,064 B1 | 5/2014 | Heron et al. | |
| 10,417,609 B2 | 9/2019 | Tiwary et al. | |
| 10,565,547 B2* | 2/2020 | Deshpande | G06Q 10/087 |
| 2001/0049690 A1 | 12/2001 | McConnell et al. | |
| 2002/0161674 A1 | 10/2002 | Scheer | |
| 2005/0149414 A1 | 7/2005 | Schrodt et al. | |
| 2006/0100896 A1 | 5/2006 | Lahey et al. | |
| 2008/0141315 A1 | 6/2008 | Ogilvie | |
| 2009/0164295 A1 | 6/2009 | Sion | |
| 2010/0045705 A1 | 2/2010 | Vertegaal et al. | |
| 2010/0106607 A1 | 4/2010 | Riddiford et al. | |
| 2010/0138037 A1 | 6/2010 | Adelberg et al. | |
| 2011/0196754 A1 | 8/2011 | Proud et al. | |
| 2012/0016780 A1 | 1/2012 | Lee et al. | |
| 2014/0136348 A1 | 5/2014 | Carroll et al. | |
| 2015/0012307 A1 | 1/2015 | Moss | |
| 2015/0294227 A1 | 10/2015 | Digby-Jones et al. | |
| 2016/0148303 A1 | 5/2016 | Carr et al. | |
| 2016/0189069 A1 | 6/2016 | de Montfort Walker et al. | |
| 2016/0196508 A1 | 7/2016 | Richter | |

OTHER PUBLICATIONS

Lao, Shannon, Amazon opens its first cashier-less Go store outside of Seattle. Sep. 17, 2018. (Year: 2018).*

* cited by examiner

*Primary Examiner* — Albert K Wong
(74) *Attorney, Agent, or Firm* — St. Onge Steward Johnston and Reens LLC

(57) ABSTRACT

A system and method allowing greatly improved flexibility to provide items for purchase to a traveler for a travel event while at the same time minimizing the estimations of items to be stocked by the carrier for the travel event. The system and method allow for adjustments of the items ordered and may prompt the user to select alternative items if an ordered item becomes unavailable prior to the travel event.

17 Claims, 13 Drawing Sheets

SYSTEM AND METHOD FOR USER TO ORDER ITEMS FOR DELIVERY DURING TRAVEL EVENT

FIELD OF THE INVENTION

The invention relates to systems and methods facilitating the order of items for later delivery at an identified location during a travel event, and more particularly, it relates to a system allowing a user to build their own customized order of specific items for delivery to a passenger during a travel event.

BACKGROUND OF THE INVENTION

The travel industry, primarily the airline industry, provisions food for travelers by calculating usages by comparing food sales versus food purchased per market. They forecast food sales 90 days before flights, and at the 60 days before flights, they calculate bookings per flight and either increase or decrease food orders to contracted caters based on the number of travelers, and the markets they are departing from. At 30 days, they make a final adjustment based on booking and cancellations, and at 29 days before the flight, they are locked into the food orders despite any changes in demand.

This method of forecasting poses several difficulties. Each departing city has different buying habits. Also, many vacation travelers or non-frequent travelers are unaware of meal options when booking a flight, as opposed to business or frequent travelers. Limited menu changes imposed by the caters also results in a waste of food. Food items designed into the menu, regardless of whether there are no sales of that item, take six months to purge that food item from the menu.

Lastly, there is no inventory control of the food items loaded on flights, despite having a point of sale device in the hands of the flight attendant. Frequent fliers awarded meals, comp meals, or damaged meals do not get inputted into the POS because of the lack of user support or device malfunction. The lack of accurate tracking of the food items has also created a shrinkage problem with employees on any given flight by taking advantage of the lack of accurate inventory. All these issues make it virtually impossible to provision a flight with meals accurately because there are either too many or not enough meals on a flight. Any meals that are not sold are disposed of resulting in direct economic loss.

While it is known to allow a user to select limited prepackaged meals (e.g., a kosher meal or a vegetarian meal), there is no ability for the user to actually build their own meal, nor is there an ability to order items that may not normally be supplied on the flight because of the limited demand of such items. This leaves all of the decision-making power in the hands of the airline who has to guess at what items passengers may want. Not surprisingly, the airlines err on the side of caution to limit waste. This is even so in the case of non-perishable items because of lack of inventory controls and the frequency of which these items go missing.

This grossly imprecise method of provisioning a flight results in significant lost sales for the airlines as passengers, knowing there are few to no items available in-flight to purchase, frequent various shops and restaurants in the terminal in order to fulfill their needs for the flight. One problem with this approach is that quite often passengers run into time constraints that do not allow them to get what they need or they forget items until on the flight at which time it is too late and the item(s) are not available for purchase.

It would be advantageous to have a system that would allow an airline to more accurately predict the needs of passengers on a flight so as not to over-provision or under-provision a flight. This increased accuracy to provisioning would function to reduce or even eliminate monetary losses on the part of the airline due to imprecise provisioning.

It would also be advantageous to allow passengers to actually be empowered to order the items they want/need during a flight even if that item is not a widely-ordered item.

SUMMARY OF THE INVENTION

The present application describes in one configuration a system and method for more accurately provisioning a flight based on input received from passengers.

It is desired therefore, to provide a system and method for provisioning a flight that reduces waste and more accurately reflects the needs of passengers.

It is also desired to provide a system and method that shifts the decision-making ability of flight provisioning to the passengers to better reflect the individual needs of passengers on a flight.

While the invention is discussed in connection with the airline industry and with the provision of meals provided during a flight, one of skill in the art will understand that the system and method applicable to the ordering of non-food items during a travel event including, for example, blankets, pillows, or other comfort aids that are also in limited supply on airline flights and that the provisioning is applicable to other common carriers including, for example, buses, trains, ferries, cruise ships, and other travel providers.

The system solves this above-listed problems by giving the travel industry the ability to accurately forecast food sales by giving a user (i.e., a future passenger/customer) the ability of pre-ordering their meals. The system may, in one configuration, be provided as a software app that is loadable on a mobile device for ease of use. Specifically, the system supports white page app integration within an airline's app ecosystem or travel industry app such as Expedia, Trviago, Priceline, etc. avoiding the need for the user having to open a separate app to pre-order their meals.

The system is provided to empower the user by providing them a diverse menu of options to choose from based on accurate data received from the airline and cater. Instead of forcing the airline to guess what items (perishable and non-perishable), the system provides the airlines user selection data well in advance of the flight departure dates. Additionally, the system connects and syncs with the airline POS system and devices identifying the users on the manifest who have pre-ordered their meals—thus reducing waste, shrinkage, and back-end processes of forecasting for the airlines. Finally, improved customer experience of meal choices for the user and reduced workload of the flight attendants by avoiding collecting payment for meals during a flight.

The present invention overcomes many of the above limitations by enabling passengers or travelers termed "users" to order items including perishable food items for a future travel event such as an airline flight. In an embodiment, users may also be able to order non-food items for delivery during a travel event, for example blankets, pillows, or other comfort aids that are also in limited supply on airline flights or other common carriers (buses, trains, ferries, cruise ships, and other travel providers).

In one configuration, a system is provided that may utilize an Ordering App that is downloadable to a user's mobile device. This Ordering App, when opened and the user is registered and logged in, allows the user to enter flight (or travel) information connecting the user with a particular date and travel destination. The system will retrieve a menu of items that are available for purchase in connection with that travel event. The user is then able to build their own meal, or travel package including both perishable and non-perishable items. This would allow the user to receive items on the flight that would normally not be available due to, for example, how seldom that item is purchased by the wider travel population.

Once the user's travel package is completed, the system then confirms that the items are available for the identified travel leg and will continue to periodically update and check that the items remain available. In the event of an interruption in availability, the system can automatically notify the user and prompt the user to select alternate items or can refund or credit as necessary.

This system is further designed to track changes in the user's travel plans including, for example, changes in flight details, delays or other issues to ensure that the travel package actually reaches the user for the travel event even if the travel event changes from the time of ordering.

In another configuration, the system allows the user via the Ordering App to check the in-flight items available for purchase on the flight the traveler is currently on. For example, the system may provide a listing of items in inventory on that flight that are not designated for a particular traveler. In this way, a user can prior to even boarding the flight, purchase such items in inventory that may be in short supply (e.g., pillows/blankets on an over night flight).

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular type of network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "process" and "processing" as used herein each mean an action or a series of actions including, for example, but not limited to, the continuous or non-continuous, synchronous or asynchronous, routing of data, modification of data, formatting and/or conversion of data, tagging or annotation of data, measurement, comparison and/or review of data, and may or may not comprise a program.

In one configuration a system is provided an order processing method for ordering items to be delivered to a user during a travel event is provided, the method including the steps of transmitting user data and travel event information relating to the user for a specified travel event from a user device to an order processing computer, presenting a list of items for available for purchase to be delivered to the user during the specified travel event on the user device and transmitting a selection of items of the list of items for purchase from the user device to the order processing computer. The method further comprises the steps of transmitting the user data, the travel event information and the selection of items from the order processing computer to an order fulfillment computer and transmitting a confirmation of the selected items to the user device for the specified travel event. The method still further comprises the steps of determining prior to a date of the specified travel event whether the selection of items is available for delivery to a carrier of the specified travel event, wherein, if a selected item is unavailable for delivery, notifying the user via the user device that the selected item is not available for delivery during the specified travel event and transmitting a list of delivered items to an attendant mobile device along with at least some of the user data and the travel event information.

In another configuration an order processing system for ordering items to be delivered to a user during a travel event is provided comprising: an order processing computer having a storage, software executing on a user data and transmitting user data and travel event information relating to the user for a specified travel event to the order processing computer, and software executing on the order processing computer transmitting a list of items for available for purchase associated with the specified travel event. The system further comprises software executing on the user data presenting the list of items for available for purchase to be delivered to the user during the specified travel event, software executing on the order processing computer receiving a selection of items of the list of items for purchase and software executing on the order processing computer transmitting the user data, the travel event information and the selection of items to an order fulfillment computer. Still further, the system comprises software executing on the order processing computer receiving a confirmation of the selected items from the order fulfillment computer and software executing on the order processing computer transmitting the confirmation of the selected items to the mobile device. The system is provided such that an attendant mobile device receives a list of delivered items to the carrier associated with the specified travel event and the attendant mobile device further receives at least some of the user data and the travel event information.

Other objects of the invention and its features and advantages will become more apparent from consideration of the following drawings and accompanying detailed description.

DETAILED DESCRIPTION OF THE INVENTION

Figure 1:
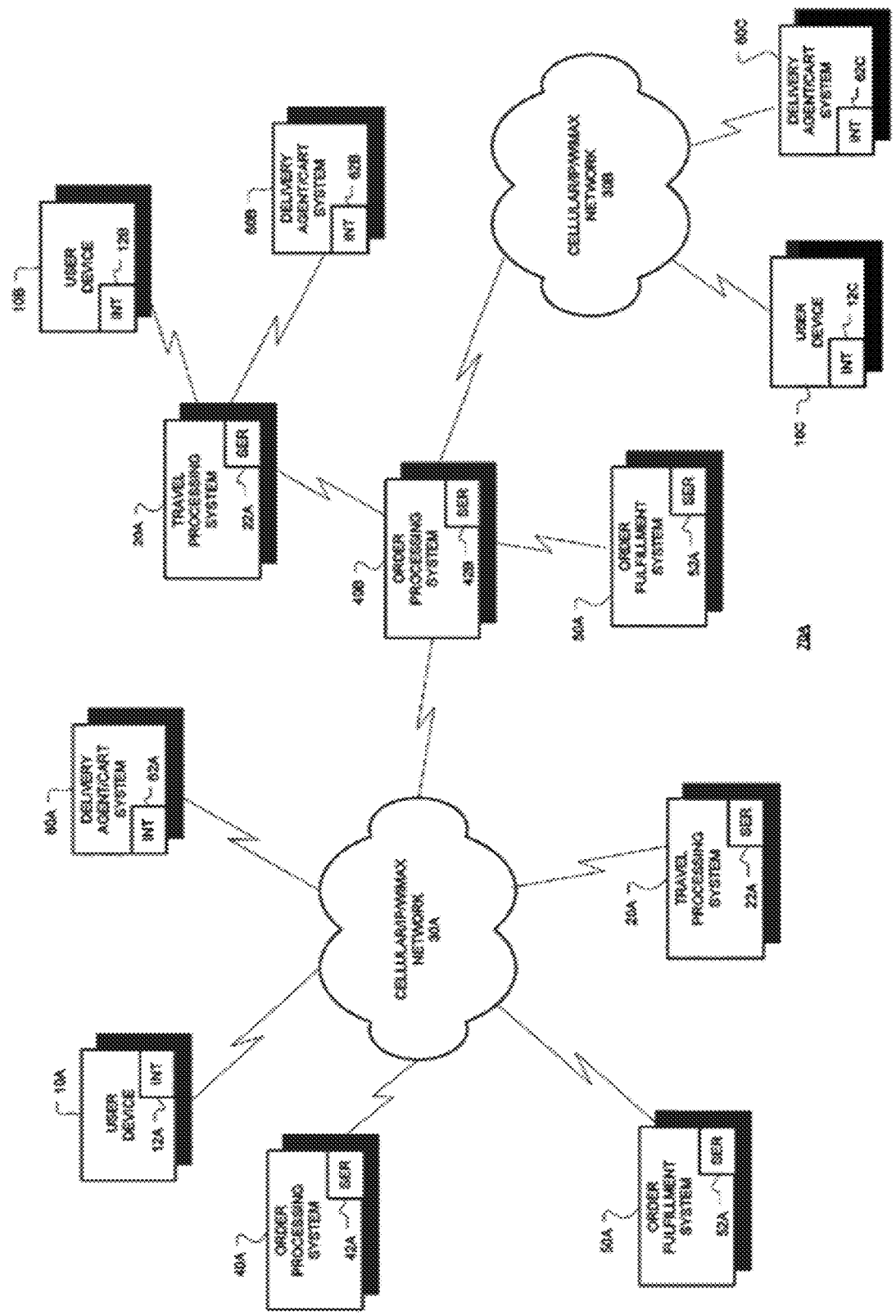
FIG. 1 is a block diagram of travel event order delivery architecture according to various embodiments.

Various details of configurations will be described below with reference to the figures. While the flowcharts will be discussed and illustrated in relation to a sequence of events, it should be appreciated that changes, additions, and omissions to this sequence can occur without materially affecting the operation of the disclosed embodiments, configuration, and aspects. Referring now to the drawings, wherein like reference numerals designate corresponding structure throughout the views.

FIG. 1 is a block diagram of a travel event order delivery architecture 70A according to various embodiments. As shown in FIG. 1, architecture 70A may include one or more order processing system 40A, 40B, several networked user devices 10A-C, one or more order fulfillment systems 50A, 50B, one or more travel processing systems 20A, 20B, several networked delivery agent/cart systems 60A-B, and wireless or wired networks 30A, 30B. In an embodiment, an order processing system 40A may be a multi-order processing system that may communicate items for sale and items ordered to a user device 10A-C and order fulfillment system 50A-B via a wired or wireless connection. In one configuration, an order processing system 40A-B may be part of a travel processing system 20A. Further, the order fulfillment system 50A-B may also be part of an order processing system 40A-B or a travel processing system 20A.

An order fulfillment system 50A-B may be a system that receives orders and enables such orders to be delivered to a carrier involved with a travel event for a user, such as a supplier delivering food items to an airplane that the user is scheduled to board where their travel event is a flight on the airplane. A travel processing system 20A-B may be a system that enables a user to select, book, or ticket a travel event including reserving or paying for a seat on the airplane flight. A user device may comprise any electronic device capable of communicating with the order processing system 40A-B via a webpage, device specific application, operating system specific application, or other application or application program interface (API). User device 10A-C may include a smart watch, mobile phone, tablet, laptop, desktop, or other such device.

Similarly, the delivery agent/cart system may be any electronic device that communicates with the order processing system 40A-B or travel processing system 20A-B via a webpage, a device specific application, an operating system specific application, or other application or API. Such a delivery agent/cart system 60A-B may include a smart watch, mobile phone, tablet, laptop, desktop, or other such device. In an embodiment, the delivery agent/cart system 60A-B may be operated by an authorized employee of the order processing system 40A-B (such as the catering company) or the carrier (such as a flight attendant on an airline flight).

An order processing system 40A, 40B, travel processing system 20A, 20B, order fulfillment system 50A, 50B may each comprise a computer 42A, 42B, 22A, 22B, 52A, 52B enabling communication between themselves and other systems and devices of travel event order delivery architecture 70A. Order processing system 40A, 40B, travel processing system 20A, 20B and order fulfillment system 50A, 50B may employ an application specific integrated circuit (ASIC) (274 FIG. 7B) to receive signals with one or more devices or systems of travel event order delivery 70A. Order processing system 40A, 40B, travel processing system 20A, 20B and order fulfillment system 50A, 50B server 42A, 42B, 22A, 22B, 52A, 52B may, in one configuration, be a webserver that transmits/receives data that is processed by a web browser application resident on user device 10A-C or delivery agent/cart system 60A-B. In another configuration, order processing system 40A, 40B, travel processing system 20A, 20B, order fulfillment system 50A, 50B including server 42A, 42B, 22A, 22B, 52A, 52B may generate Hyper Text Markup Language encoded data that user device 10A-C or delivery agent/cart system 60A-B may process via a resident web browser.

In still another configuration, order processing system 40A, 40B, travel processing system 20A, 20B, order fulfillment system 50A, 50B including server 42A, 42B, 22A, 22B, 52A, 52B may communicate data including order, user, travel event related data using other protocols including an application specific protocol. User device 10A-C or delivery agent/cart system 60A-B or system order processing system 40A, 40B, travel processing system 20A, 20B and order fulfillment system 50A, 50B may include a program to decode/encode the application specific protocol communications between themselves and another user device 10A-C or delivery agent/cart system 60A-B or system order processing system 40A, 40B, travel processing system 20A, 20B, order fulfillment system 50A, 50B. As shown in FIG.

1, user device 10A-C may be coupled to order processing system 40A, 40B or travel processing system 20A-B via a network 30A, 30B. As shown, user device 10B may be coupled directly to travel processing system 20A via a wired or wireless connection. Similarly, delivery agent/cart system 60A-60B may be able to communicate directly or indirectly with an order processing system 40A, 40B or travel processing system 20A-B via a network 30A, 30B or other device or system in an embodiment. Further, order processing system 40A, 40B may be able to communicate directly or indirectly with a travel processing system 20A-B via a network 30A, 30B or other device or system.

User device 10A-C and delivery agent/cart system 60A-60B may include an interface (network interface controller) 12A-12C, 62A-62B that enables IP based communication with order processing system 40A, 40B, order fulfillment system 50A-B, or travel processing system 20A-B. The interface 12A-12C, 62A-62B may include a modem/transceiver 244 (244, FIG. 6A). The modem/transceiver 244 may include an ASIC. In one configuration, user device 10A-C or delivery agent/cart system 60A-60B interface 12A-12C, 62A-62B may communicate with order processing system 40A, 40B, order fulfillment system 50A-B, or travel processing system 20A-B via several networks.

Each user device 10A-C or delivery agent/cart system 60A-60B may include an interface 12A-12C, 62A-62B that enables communications between a user device 10A-C or delivery agent/cart system 60A-60B and order processing system 40A, 40B, order fulfillment system 50A-B, or travel processing system 20A-B via network 30A, 30B directly or indirectly. In an embodiment, a user device 10A-C or delivery agent/cart system 60A-60B may be cellular device such an iPhone® or other smartphone, tablet device including an iPad®, laptop, tablet, desktop, or other electronic device capable of communicating via one or more wired or wireless protocols. Order processing system 40A, 40B, order fulfillment system 50A-B, or travel processing system 20A-B may comprise an electronic device 260 that may include a module 274 to communicate signals with interface 12A-12E. Order processing system 40A, 40B, order fulfillment system 50A-B, or travel processing system 20A-B may also comprise servers 42A, 42B, 22A, 22B, 52A, 52B (292, FIG. 6B).

Figure 2A:
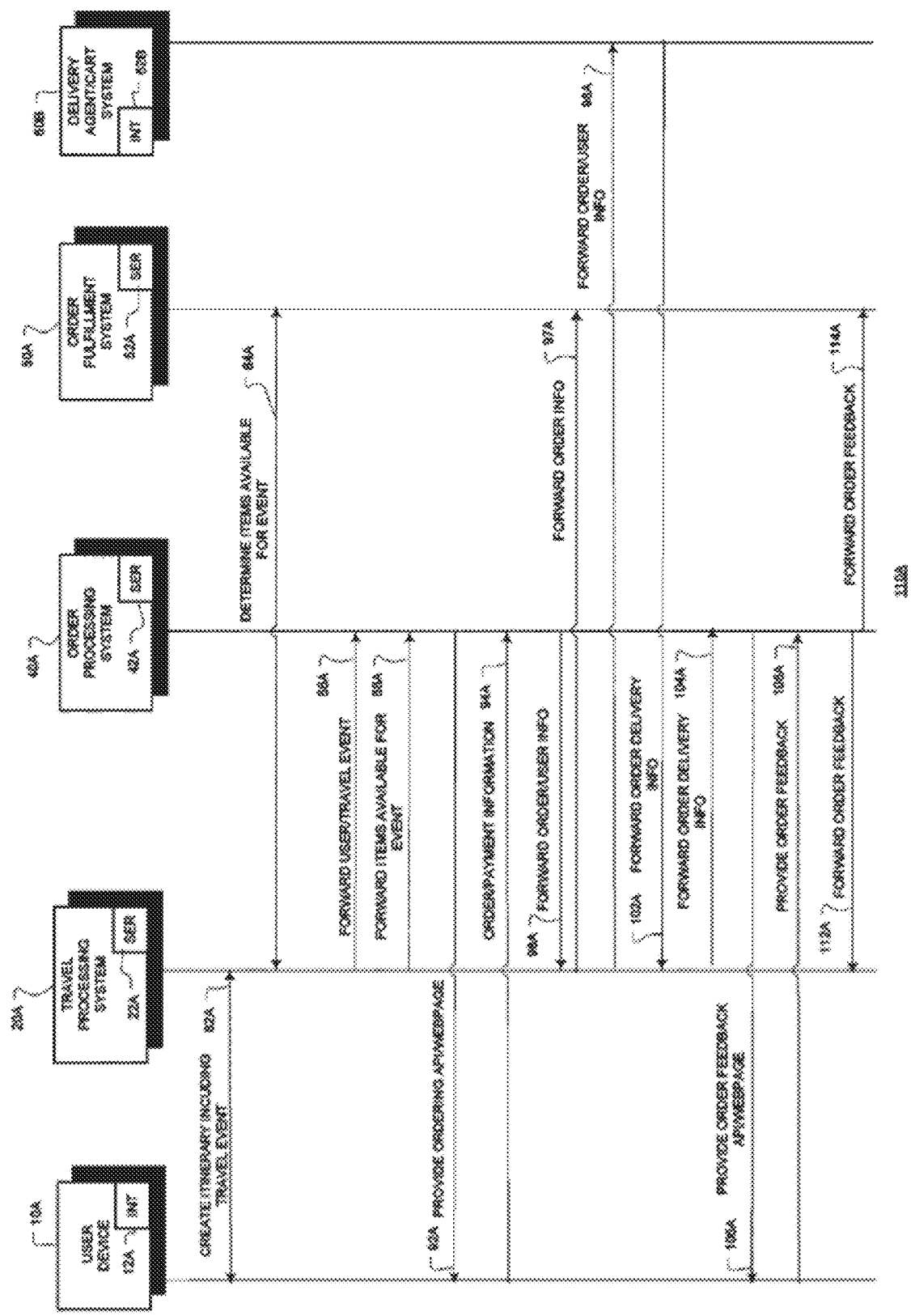
FIG. 2A is a diagram of communications between devices and systems in a travel event order delivery architecture according to various embodiments.
Figure 2B:
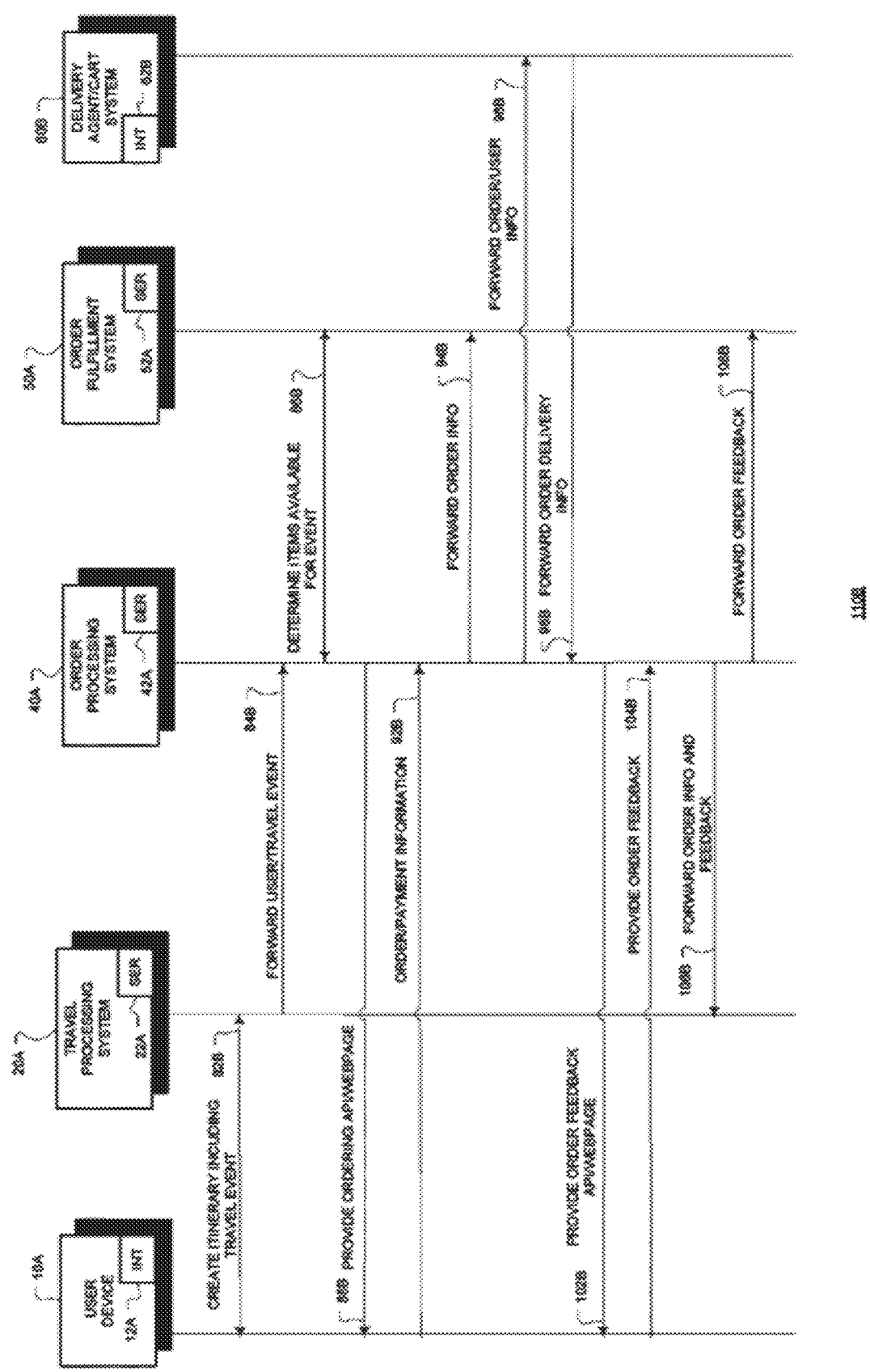
FIG. 2B is a diagram of communications between devices and systems in a travel event order delivery architecture according to various embodiments.
Figure 2C:
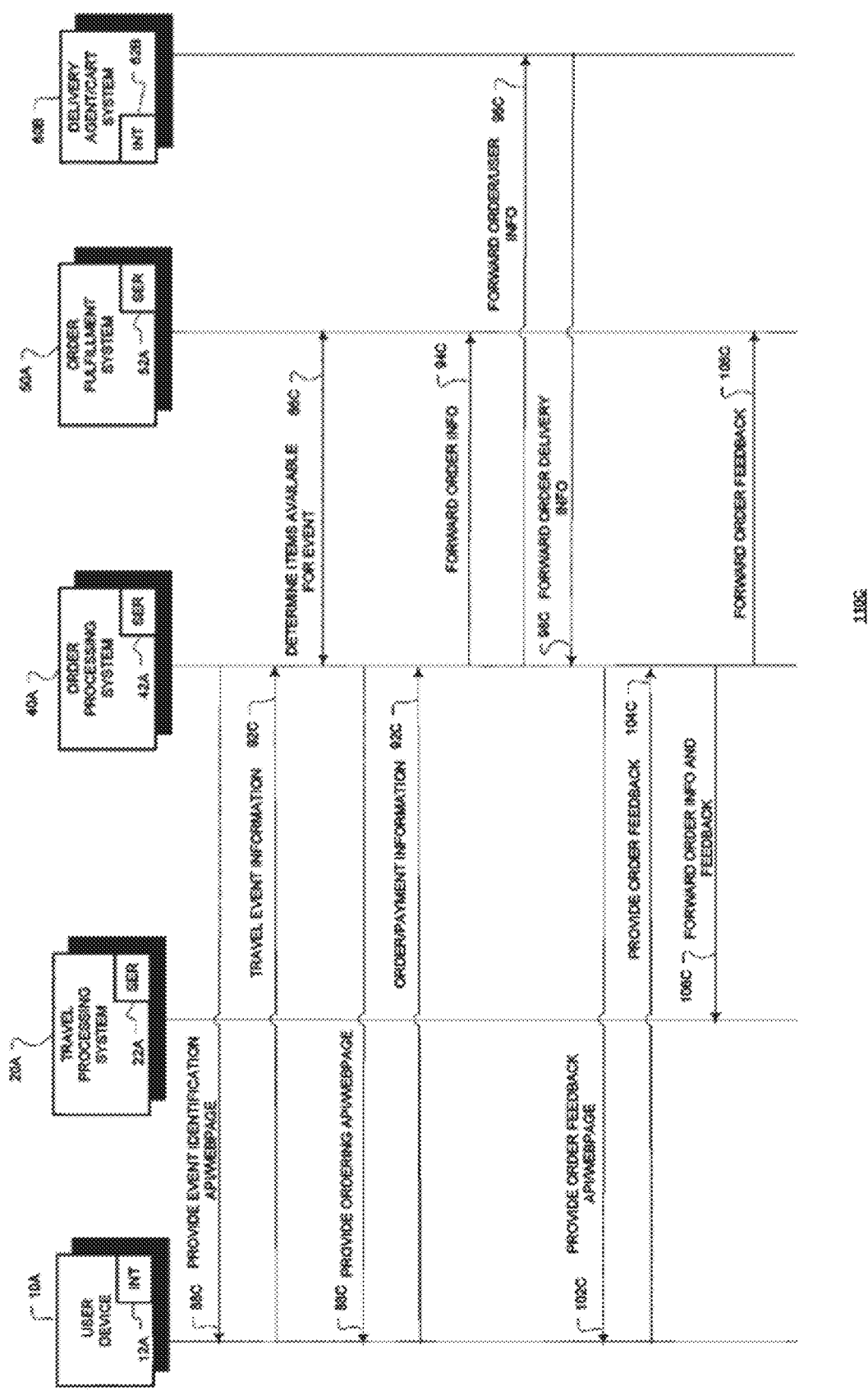
FIG. 2C is a diagram of communications between devices and systems in a travel event order delivery architecture according to various embodiments.

FIGS. 2A-2C are diagrams of communications between devices and systems in a travel event order delivery architecture according to various configuration. Systems order processing system 40A, 40B, order fulfillment system 50A-B, or travel processing system 20A-B may have different roles due to user security, item delivery security and limitations based on the related travel event. Travel processing system 20A-B may control the operation of other system components and the flow of data therebetween as detailed in FIG. 2A. As shown in FIG. 2A, a user via a user device 10A, may communicate with travel processing system 20A-B to create a future travel event (communication 82A). As noted, the travel processing system 20A-B may be operated by a direct travel event provider, such as an airline or a $3^{rd}$ party, and may comprise a website providing access to travel events. Once, a user creates a travel event, travel processing system 20A communicates with order fulfillment system 50A to a real time list of items that a user may order to be delivered during the specified travel event.

The order fulfillment system 50A for example may be a caterer that allows limited food items for travel events based on their current or expected future inventory or the carrier's stated allowed items, or combination thereof. The travel processing system 20A may only provide the time, date, and flight number for the future travel event to the order fulfillment system 50A to protect the privacy of a user 136. As noted, an order processing system 50A may provide in real time or periodically a list of items available for delivery on a particular travel event (such as an airline flight). In an embodiment, a travel processing system 20A may forward such item list in real time or periodically to an order processing system 40A (communication 86A).

Figure 3A:
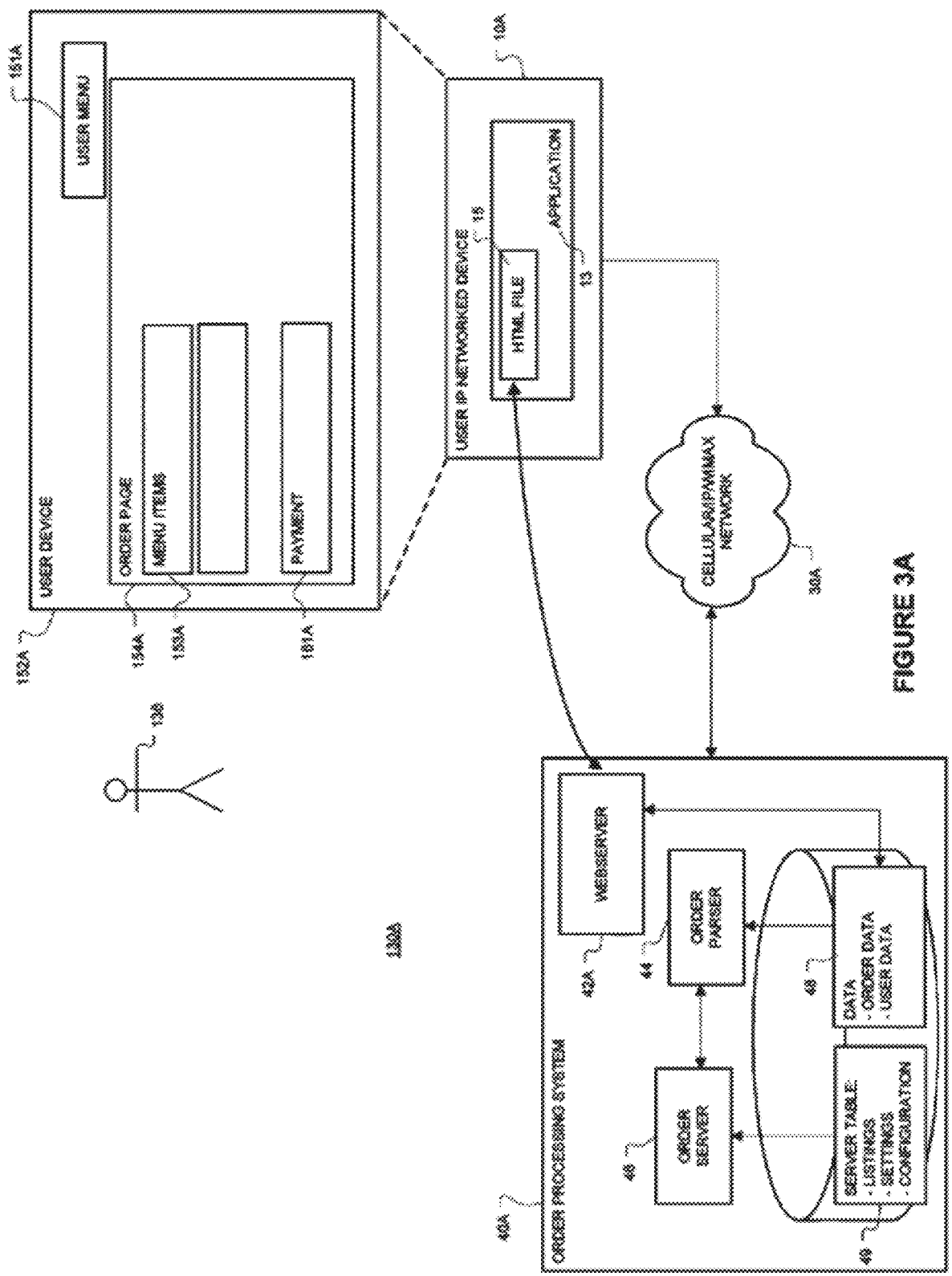
FIG. 3A is a block diagram of travel event order delivery architecture providing a user order page to a user device according to various embodiments.
Figure 3B:
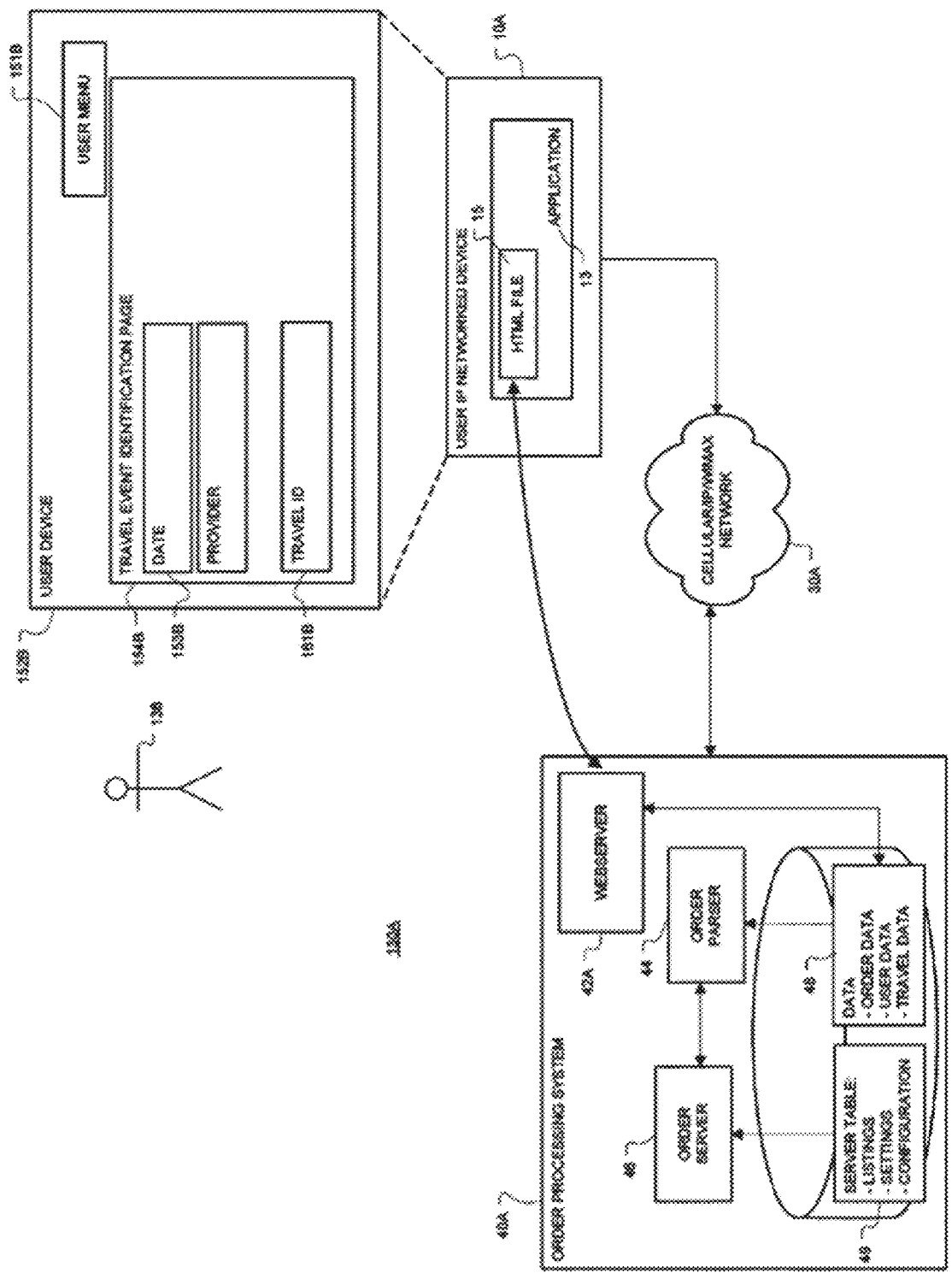
FIG. 3B is a block diagram of travel event order delivery architecture providing a user travel event identification page to a user device according to various embodiments.
Figure 4:
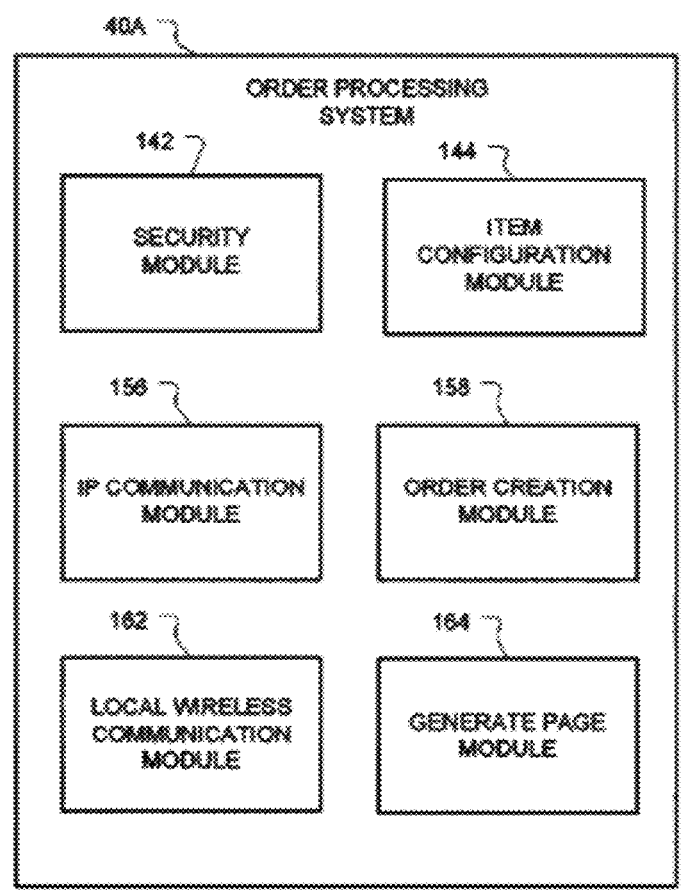
FIG. 4 is a block diagram of an order processing system according to various embodiments.
Figure 5:
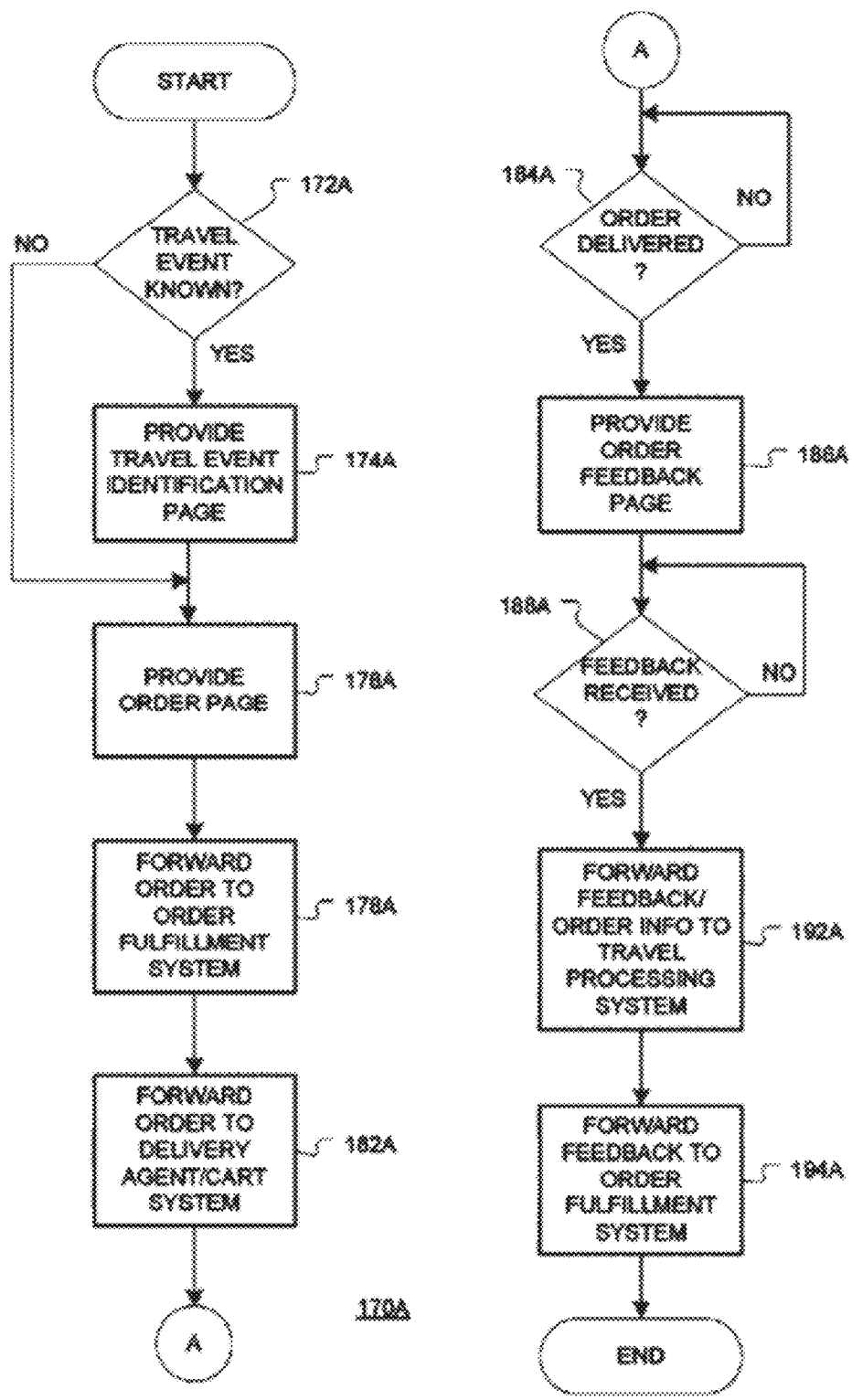
FIG. 5 is a flow diagram illustrating several methods according to various embodiments.

An order processing system 40A may store the item list in a database 48 (FIG. 3A) and generate an order page (152A, FIG. 3A) to be communicated to a user device 10A directly or indirectly via a travel processing system 20A (communication 92A). A travel processing system 20A may also forward user related travel event information (communication 86A) to an order processing system 40A. The order processing system 40A may store such information in a database 48 and use such information to communicate an order with a travel processing system 20A (communication 96A). An order processing system 40A may employ a series of process steps 170A shown in FIG. 5 and include the modules shown in FIG. 4 to process orders. In an embodiment, an order processing system 40A may determine whether a travel processing system 20A or other resource has provided the travel event where items are to be delivered (activity 172A). In FIGS. 2A and 2B, the travel processing system 20A provides such information. In FIG. 2C, a user 136 via a user device 10A is provided with a travel identification page (activity 174A) as shown in FIG. 5 so a user may identify their travel event. As shown in FIG. 3B, the travel event identification page 154B may request the travel date and provider (carrier) 153B and a travel ID 161B such a record locator code.

Once the order processing system 40A has determined or been provided the user's travel event, it can then generate an Order page (activity 176A). As noted in FIG. 2A, a travel processing system 20A may provide a list of items available for delivery during the travel event. As shown in FIGS. 2B and 2C, an order processing system 40A may communicate with order fulfillment system 50A to determine the real time item list based on the travel event. An order processing system 40A may then use the item list to generate the order page 152A shown in FIG. 3A. As shown in FIG. 3A, the order page 152A includes a list of items 153A, payment option 161A, and user menu 151A. The user menu 151A may enable a user 136 to view current or past orders and see upcoming travel events.

Once a user completes the order page, an order processing system 40A may forward the order with user information to a travel processing system 20A (communication 96A) as shown in FIG. 2A. The travel processing system 20A may then communicate the order to the order fulfillment system 50A and a delivery agent/cart system 60B (communications 97A and 98A and activities 178A and 182A of FIG. 5). Such a configuration may be required due to security protocols at the order processing system 50A and for the delivery agent/cart system 60B. In another embodiment, an order processing system 40A may communicate the order to the order fulfillment system 50A and a delivery agent/cart system 60B directly (communications 94B and 96B in FIG. 2B and communications 94C and 96C in FIG. 2C).

Figure 3C:
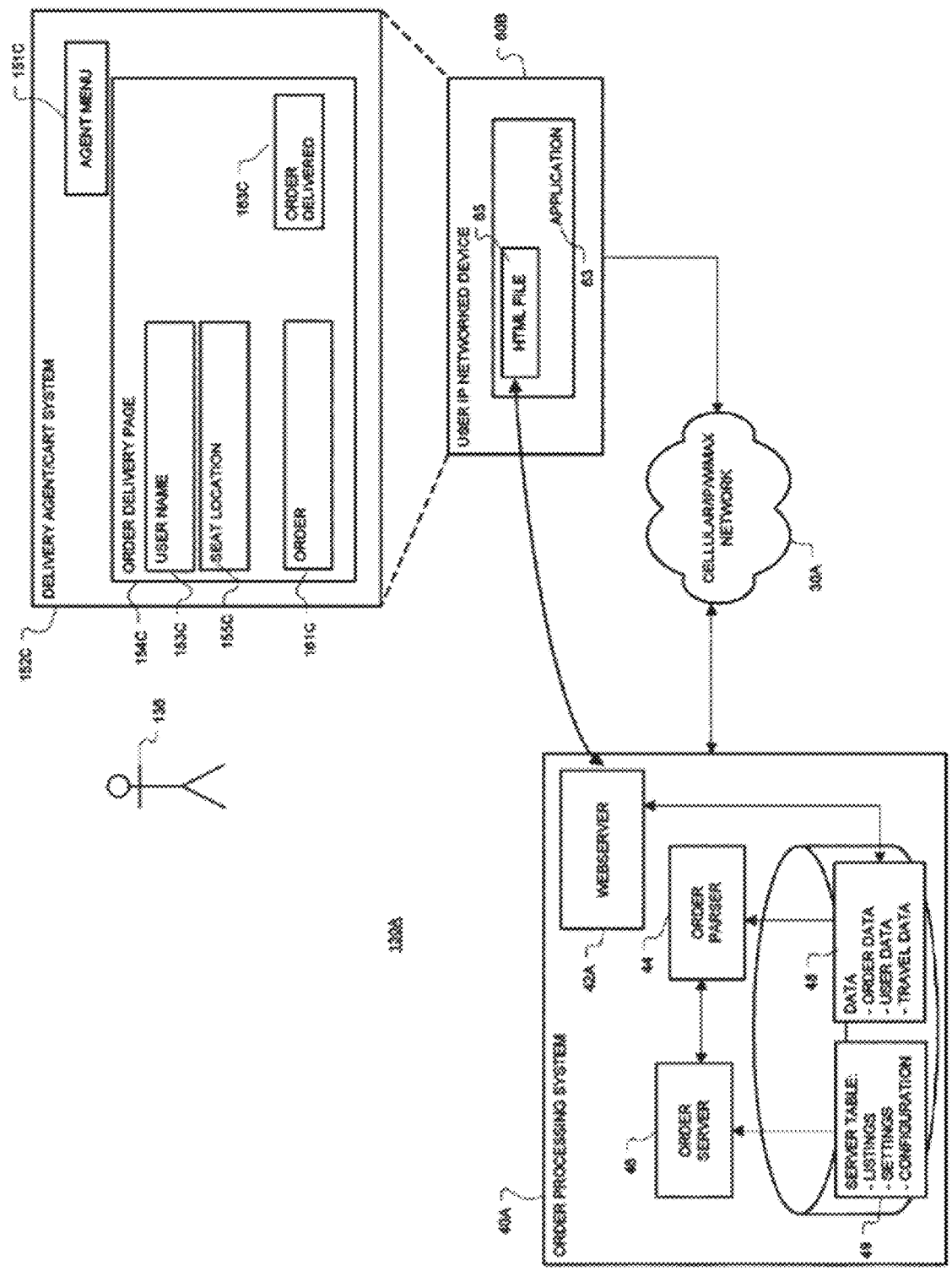
FIG. 3C is a block diagram of travel event order delivery architecture providing a delivery agent order delivery page to a delivery agent/cart system according to various embodiments.

FIG. 3C shows a delivery agent order delivery page 152C that may be displayed on a delivery agent/cart system 60B according to various embodiments. As shown in FIG. 3C, the order delivery page 152C may include the user's name 153C, seat location (if known) 155C, order details 161C, and an order delivered icon 163C. In an embodiment, a travel processing system 20A or other system may provide or update seat location to a delivery agent/cart system 60B in real time. A delivery agent/cart system 60B user 136 may select the Order delivered icon 163C once an order is delivered (activity 184A).

In an embodiment, the travel processing system 20A may receive the order delivery communication from a delivery agent/cart system and forward a notice to the order processing system 40A (communications 102A, 104A of FIG. 2A). In another embodiment, the delivery agent/cart system 60B may communicate order delivery information directly to an order processing system 40A (communications 98B, 98C of FIGS. 2B, 2C). Order processing system 40A may then forward an order feedback page, text, E-mail or other communication to a user device 10A (communications 106A, 102B, 102C of FIGS. 2A-2C) (activity 186A). Once feedback is received (activity 188A), the feedback may be forwarded to the travel processing system 20A and order fulfillment system (activity 192A and 194A) (communications 112A, 114A FIG. 2A, 106B, 108B FIG. 2B, and 106C, 108C FIG. 2C).

Figure 6A:
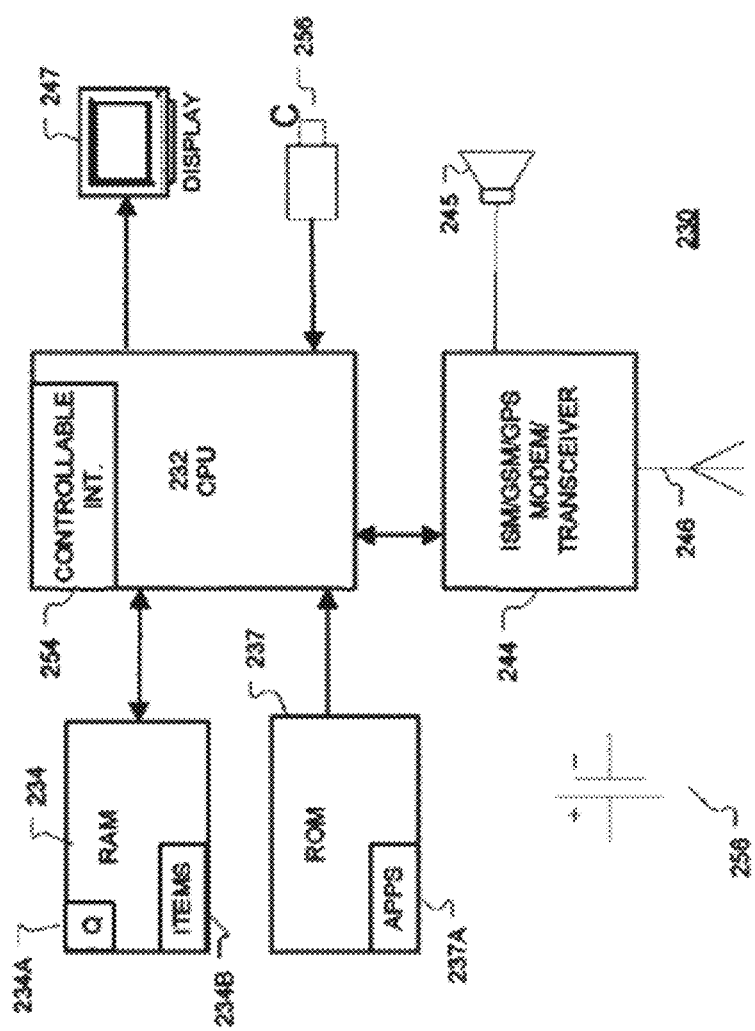
FIG. 6A is a block diagram of an article according to various embodiments.

FIG. 6A illustrates a block diagram of a device 230 that may be employed at least in part in a user device 10A-10C or delivery agent/cart system 60A-B in various embodiments. The device 230 may include a central processing unit (CPU) 232, a random-access memory (RAM) 234, a read-only memory (ROM) 237, a local wireless/GPS modem/transceiver 244, a display 247, a camera 256, a speaker 245, a rechargeable electrical storage element 256, and an antenna 246. The CPU 232 may include a control interface 254 including an IP type network controller interface. The RAM 234 may include a queue or table 248 where the queue 248 may be used to store web pages, applications, or APIs. The RAM 234 may also include program, algorithm, and system data and instructions. The rechargeable electrical storage element may be a battery or capacitor in an embodiment.

The modem/transceiver 244 may couple, in a well-known manner, the device 230 to a wired or wireless network 30A, 30B to enable communication with an order processing system 40A-40D, travel processing system 20A-B, or order fulfillment system 50A-B. The modem/transceiver 244 may also be able to receive global positioning signals (GPS) and the CPU 232 may be able to convert the GPS signals to location data that may be stored in the RAM 234 and provided to an order processing system 40A-40D, travel processing system 20A-B, or order fulfillment system 50A-B with a URL/URI request. The ROM 237 may store program instructions to be executed by the CPU 232 or control interface 254 (applications 237A). The applications 237A may include a web browser program or application. The RAM 234 may also be used to store program information, queues, databases, and overhead information.

Figure 6B:
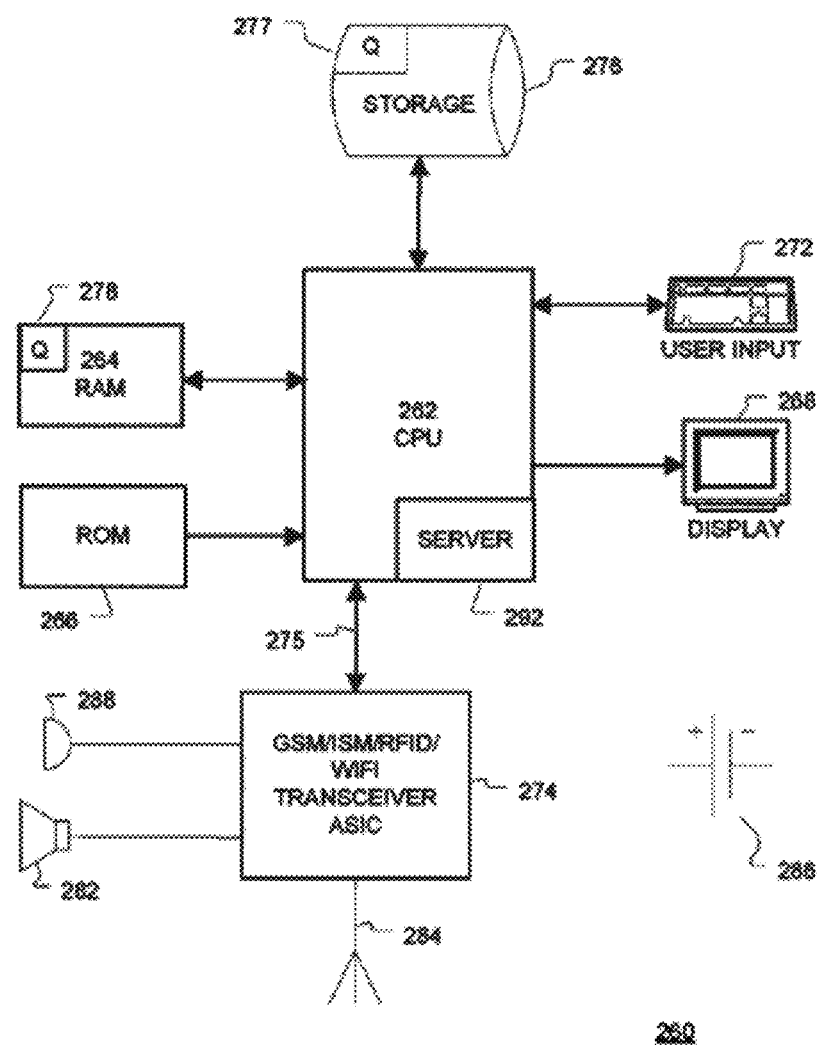
FIG. 6B is a block diagram of an article according to various embodiments.

FIG. 6B illustrates a block diagram of a device 260 that may be employed at least in part in an order processing system 40A-40D, travel processing system 20A-B, or order fulfillment system 50A-B in various embodiments. The device 260 may include a CPU 262, a random-access memory 264, a ROM 266, a display 268, a user input device 272, a transceiver ASIC 274, a microphone 288, a speaker 282, storage 276, electrical energy storage unit 286, and an antenna 284. The CPU 262 may include a server 292. The RAM 264 may include a queue 278 where the queue 278 may store reference order content data. The server 292 may function as the web-server/e-mail processor 42A, 42B of the order processing system 40A-40D, travel processing system 20A-B, or order fulfillment system 50A-B.

The ROM 266 is coupled to the CPU 262 and may store the program instructions to be executed by the CPU 262 and the server 292. The ROM 266 may include applications and instructions for the security module 142, item configuration module 144, IP communication module 156, order creation module 158, local wireless communication module 162, and generate page module 164 shown in FIG. 4. The RAM 264 may be coupled to the CPU 262 and may store temporary program data, overhead information, and the queues 278. The user input device 272 may comprise an input device such as a keypad, touch pad screen, track ball or other similar input device that allows the user to navigate through menus in order to operate the device 260. The display 268 may be an output device such as a CRT, LCD or other similar screen display that enables the user to read, view, or hear multimedia content.

The microphone 288 and speaker 282 may be incorporated into the device 260. The microphone 288 and speaker 282 may also be separated from the device 260. Received data may be transmitted to the CPU 262 via a serial bus 275 where the data may include messages, reference images, or pages received, messages, or web pages to be transmitted, or protocol information. The transceiver ASIC 274 may include an instruction set necessary to communicate messages or web pages, applications, APIs, and data via network 30A, 30B. The ASIC 274 may be coupled to the antenna 284 to communicate messages, content, or pages wireless. When a message is received by the transceiver ASIC 274, its corresponding data may be transferred to the CPU 262 via the serial bus 276. The data can include wireless protocol, overhead information, sensor, and pages to be processed by the device 260 in accordance with the methods described herein.

The rechargeable electrical storage element 286 may be a battery or capacitor in an embodiment. The storage 276 may be any digital storage medium and may be coupled to the CPU 262 and may store temporary program data, overhead information, and databases 48, 49.

Any of the components previously described can be implemented in a number of ways, including embodiments in software. Thus, the devices 230, 260 elements including the RAM 234, ROM 237, CPU 232, transceiver 244, storage 276, CPU 262, RAM 264, ROM 266, and transceiver ASIC 274, may all be characterized as "modules" herein.

The modules may include hardware circuitry, single or multi-processor circuits, memory circuits, software program modules and objects, firmware, and combinations thereof, as desired by the architect of the architecture 10 and as appropriate for particular implementations of various embodiments.

The apparatus and systems of various embodiments may be useful in applications other than a sales architecture configuration. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

Figure 7A:
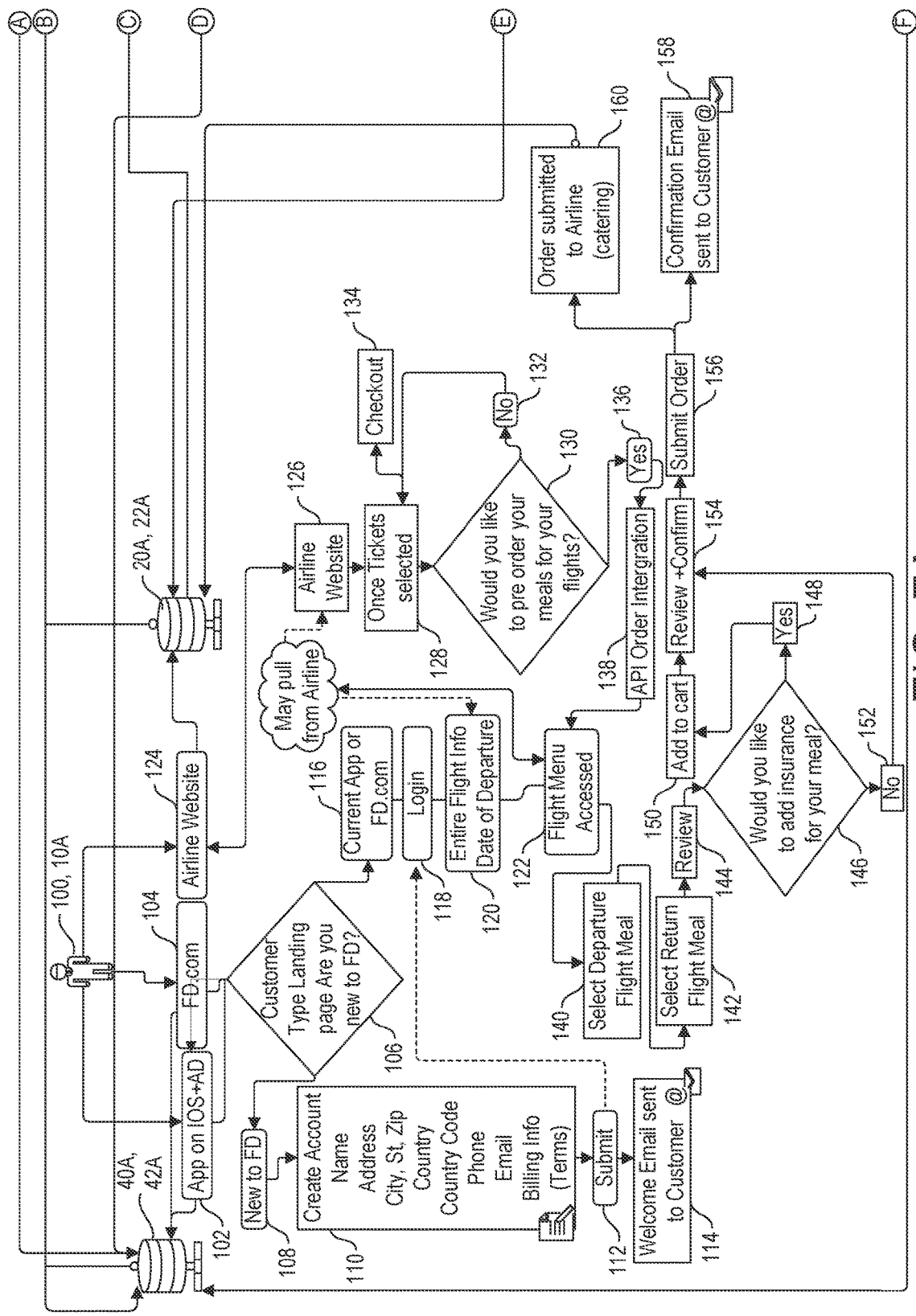
FIG. 7A is a flow diagram of a process according to the travel event order delivery architecture of FIG. 1.
Figure 7B:
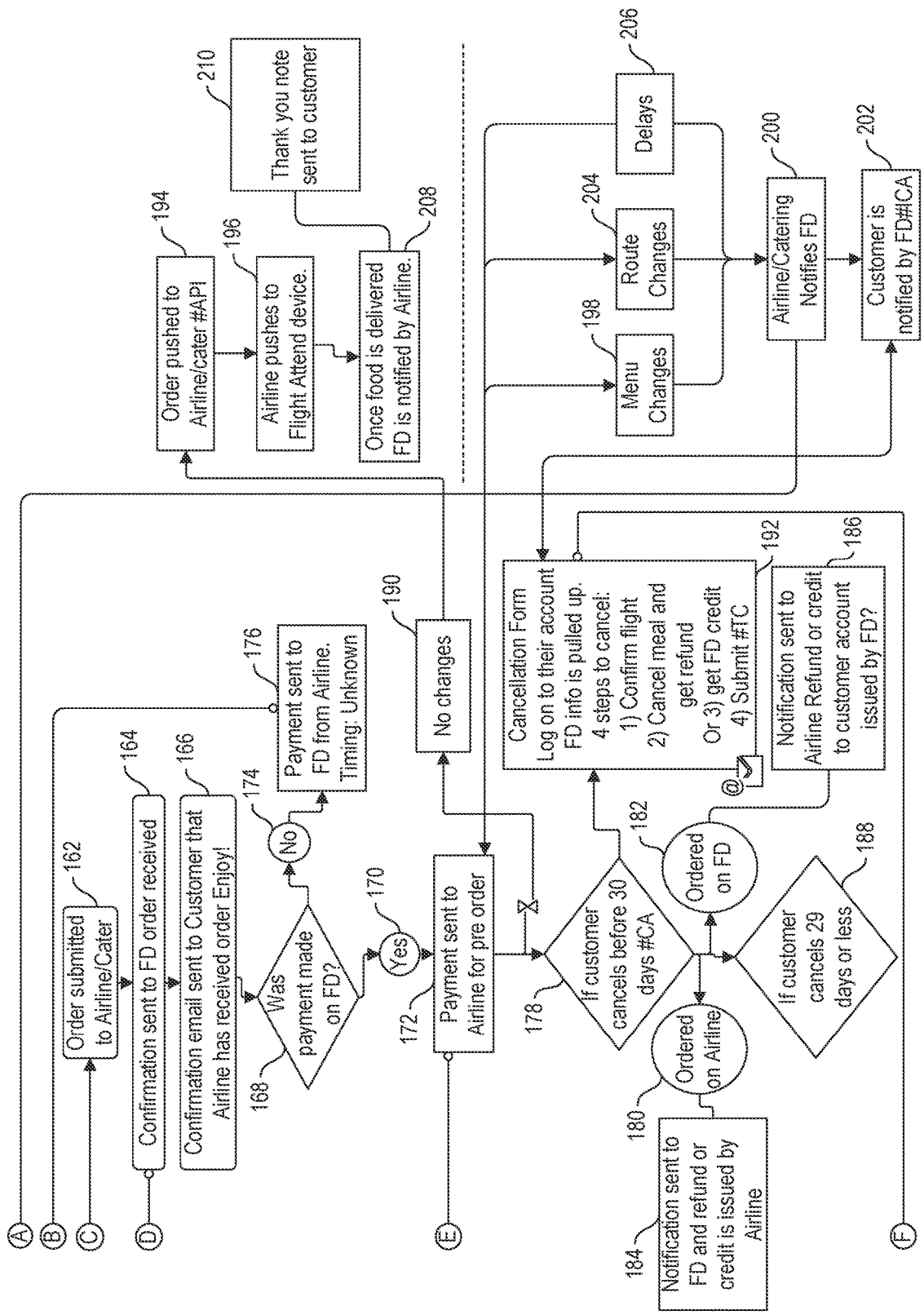
FIG. 7B is a flow diagram according to FIG. 7A.

Referring now to FIGS. 7A-7B, a user 100 via a user device 12A enters a relevant app store 102 (e.g., the Apple, Samsung, Windows store, or Google Play store) and searches for an app associated with order processing system 40A (the Ordering App) or the white label named application and downloads the Ordering App to the mobile device 104. Once downloaded, the user enters the Ordering App to a welcome screen 106 that prompts the user to enter their username and password, and if they are a new user 108, prompts the user to create and account 110.

The user is greeted with a secure https signup page that provides a form to enter first and last name as it appears on ID, current address, email, phone number, & payment options of Credit Card, Paypal, Venmo, Apple Pay, Google Pay, or any other common pay service along with billing address. The user submits the information and data is pushed to a secure backend cloud database with credit or debit card info masked and encrypted. Once this information is entered, the user can submit 112 the information to the server of the Ordering App where an account will be created and a welcome email will be generated and sent to the user 114.

Additionally, there is a "forget password" for retrieval of lost credentials.

If the user already has an account 116 or has successfully created a new account, the process will login the user 118. At this point, the user is then given the option to begin ordering for a specific flight or set up personal preferences. The user is presented with a form where the user can enter data relating to the name of the traveler, the airline, the flight number, the confirmation number, the departure city, and the date of departure 120.

The user interface allows for coordinating multiple flights and multiple airlines. Using the Airline API, this data is verified and returns a "successfully found," or a "Flight not Found," or "Airline does not offer Service" message that is presented to the user. The successful page uses the Specific Airline API to display food menu options for the flight chosen 122.

For white-label apps 124 (e.g., using the airline website or app, Expedia), the step of the user entering data 120 applies except that only the specific airline API is used, and the entered data is verified against the airline database, returning the menu for the specific flight chosen 122. So, for example, the user accesses the white-label app 124 that connects the user to the airline website 126 where the user can search and select a ticket 128. The system will then proceed to query whether the individual would like to pre-order a meal for the flight(s) 130. If no 132, the system proceeds back to select a ticket 128 or if no other tickets are to be selected, then the system moves to checkout 134. If the user selects yes 136 and does want to preorder a meal, the system will then move to API order integration 138 using the Specific Airline API to display food menu options for the flight chosen 122.

Using the Airline API, the app returns the menu for the flight(s) chosen 122, allowing the user to select desired items and see a rolling cart cost. The user will then select a first (departure) flight meal 140 and then a second (return) flight meal 142 if applicable. It should be noted that any number of flight meals can be selected depending on the flight legs, the connections, the number of flights being booked and so on. One of skill in the art will understand that for each flight a user will travel on, the user could select a meal falling with the parameters of options provided by the airline for that flight or leg.

Upon completion of selection for all flights, the user is presented with the review cart 144 at which point the user may make modifications to items, quantity of each item, and optionally select insurance 146 if desired. If the user wants to purchase insurance for the selections 148, that will be added to the cart 150. If no insurance 152 is selected, the system will move to review and confirm 154. If the user is satisfied with the selections and result, the system will proceed submit the order 156. At this point, the system will generate a confirmation email that is sent to the user 158. Additionally, the system will submit the order 160 to the airline via travel processing system 20A, which includes server 22A.

Travel processing system 20A receives the order 162 and a confirmation that the order has been received 164 is sent to the order processing system 40A including server 42A. Optionally, a further email may be sent to the user that the airline has received the order 166. At this point, the system will determine if payment was made 168 on the order processing system 40A. If yes 170, payment is sent to the travel processing system 20A for pre order 172. If no 174, payment is made on the travel processing system 20A, payment is sent 176 to the order processing system 40A.

It will be understood by those of skill in the art that the user can select a preferred method of payment that has been pre-stored or they can add a new payment option.

The user may, at any time up to a deadline, make modifications to the order. The order is submitted to the secure database for storage and delivered to the Airline via API to the Airline or Cater service depending on the airline fulfillment process.

As stated previously, a notification(s) of the order may be sent to the user email on file or via app push notifications, as well as the Airline/cater service via API. Confirmation of Airline/Cater receipt may further be retrieved and stored in the customer record.

In one configuration, cadence checks with the airline/cater API are made to ensure the order has not been modified or needs to be canceled due to change in menu items, or flight cancellations. Changes are immediately sent to the user via email, text notification, or mobile app push notification service based on user preferences.

Payments for non-whitelisted apps are securely handled by the order processing system 40A using a secure connection with a payment processor. Payments for the order with the airline/cater are made via secure method choice of the Airline/Cater. Whitelisted apps perform payment using the Airline's system, the order processing system 40A tracks these on the backend database for payment reconciliation.

Upon the need for a refund, via user selection within the cancellation window, or due to the inability to fulfill the order by the Airline, Non-whitelisted apps provide an account credit for future flights that remain in the user's account until utilized in future purchases. The order processing system 40A via the Ordering App sends a notification via API to the Airline/Cater of user cancellation within the cancellation window, confirmation from the Airline is captured and stored in the user record against the corresponding flight(s), along with a confirmation email/notification to the user.

In the event that the customer cancels before a cutoff period 178 (e.g., 30 days prior to the flight), the system will determine if the order was placed on 180 the travel processing system 20A or placed on 182 the order processing system 40A. If the order was placed 180 on the travel processing system 20A, then a notification is sent to the order processing system 40A and a refund or credit is issued 184 by the travel processing system 20A. If the order was placed 182 on the order processing system 40A, then a notification is sent to the travel processing system 20A and a refund or credit is issued 186 by the order processing system 40A.

For the cancellation procedure, it is contemplated that many steps and forms may effectively be used. In one configuration, a cancellation form is presented 192 that may include various steps including but not limited to: confirming the flight, confirming cancellation of the items ordered, receiving a refund or credit and submitting to the relevant system (travel processing system 20A—order processing system 40A).

In the event that the customer cancels after a cutoff period 188 (e.g., 30 days prior to the flight), the system can then determine what the process is depending on a number of parameters including, for example but not limited to, the flight details, the order details, the user and their travel history (i.e., a perk for frequent fliers with the order processing system 40A could be ability to modify or cancel orders closer to the actual flight date), and so on. The refund or credits could be supplied on a sliding scale such that the closer the date to a cutoff date the smaller the refund or credit for cancellation. Those of skill in the art will recognized that many types of credit and refunds system can be envisioned and not depart from the spirt of the invention.

If no changes or cancellations are received 190, the system will proceed to transfer the order to the Airline/Cater 194.

Using the Airline/Cater API, the Ordering App gathers and notifies of specific fulfillment milestones where available. These milestones may include for example, Ready to Deliver, Transfer to Ground Crew, Meal on the plane, along with other pertinent data points as deemed essential. The Ordering App checks at each milestone to ensure the accuracy of the order, as well as the flight details such as plane change or seat change, and notifies the necessary party (cater, loading personnel, on board flight personnel, etc.) of updated information and any discrepancies.

The system then proceeds to the step where the order processing system 40A including server 42A pushes orders to the flight attendant portal on the day of the flight 196. Flight attendants can view orders by flight number/Airline. The App can also be used with third party sites such as all travel, hotel booking sites. Specifically, the system supports white page app integration within the travel, hotel booking sites.

The flight attendant portal checks against the manifest via the Airline API to ensure seat/passenger accuracy. A flight attendant portal user app will be installed onto the flight attendant's handheld devices integrating with the airline's API. The flight attendant portal user app will denote all pre-orders for each flight. The flight attendant portal user app will also have the capability to denote any comped amenities in all cabins. It will also have the ability to sell items that have not been pre-ordered. The flight attendant portal user app will comprise the flights seating chart and will highlight pre-orders at each specific seat by using a color code, text, symbol, etc. The flight attendant portal user app will also have the capability to identify pre-orders in first, business, and coach class cabins. Once the order is delivered to the passenger the order will be marked in the flight attendant portal user app as delivered. This may be done through scanning the items or by the flight attendant touching the seat on the chart. Orders will be sent to the flight attendants' handheld devices when the manifest is reconciled before the flight. The flight attendant portal user app will also be able to communicate with the other flight attendant handheld devices on board each flight. This will ensure that all flight attendants are provided with up-to-date information for each flight from start to finish. All purchases and inventory will then be transmitted to the airline either during the flight or shortly after landing using WiFi, Bluetooth, or cell data, etc.

For the flight attendant portal, orders made for the specific flight are listed by seat number and reference the flight manifest via the airline API. The flight attendant checks off items ordered as they are delivered. Again, this may be done through scanning the items or by the flight attendant touching the seat on the chart. Alternatively, when the flight attendant portal user app is connected to the smart inventory bin system, the delivery of the items will be recorded automatically once the item is removed from the bin noting the time that the item was removed from the bin. This delivery information is reconciled with the order processing system 40A to ensure accuracy of the delivery as well as an automatic refund of items that have not been delivered.

It should be noted that an airline will review the manifest of passengers on board a particular flight and will estimate the needed items for purchase on the flight based on historical data, flight data and a host of information airlines use for making an estimation of how many items to provision the flight with. This process is inherently imprecise despite best efforts to of the airline industry to develop algorithms to project demand. Any over supply of items can result in waste (perishable items) and any under supply can result in lost revenues and lowered customer satisfaction. The present system helps to limit this imprecision were the order processing system 40A transmits user data, flight information for the user and a selection of items for the flight to an airline computer. The airline computer can then identify the user on the flight manifest. It will be understood by those of skill in the art that when the airline computer receives the list of purchased items to be delivered to the user during the flight, the user need not be included in the calculation of needed items for that flight. If a significant number of users have pre-purchased items for the flight, the number of estimated items needed for stocking in inventory on the flight is greatly reduced. This reduces uncertainty for the airline as the passengers will have already paid for the items that are being delivered to the plane for distribution during the flight. In one configuration, the airline computer can parse the list of selected items ordered and paid for and adjust the calculation of estimated items for delivery to the flight taking into account all the individual items that were pre-ordered. For example, if only food was pre-ordered, the airline computer would include the user on the manifest in calculating the provisioning of non-perishable items and vice versa. Additionally, it is contemplated that historical purchasing practices of the user could be used to adjust estimated provisioning. For example, if the user has in the past consistently purchased a pillow and blanket on previous flights, but did not purchase for this current flight, the order processing system 40A could prompt the user whether they want to purchase a pillow and blanket. This historical data could also be used by travel processing system may 20A in estimating the provisioning of the flight.

The order processing system 40A may also automatically check confirmed orders against the Airline/Cater API to validate that the menu has not changed 198. If an ordered item is no longer available, in one configuration the travel processing system may 20A notify 200 the order processing system 40A. The order processing system 40A then notifies the user via email or notification service to log in to the Ordering App to modify the order. Changes in the selection are confirmed, sent back to the Airline/Cater, and new confirmation is recorded, and notification sent to the user 202.

In addition to changes in the menu, flight records are monitored via API to track changes in routes 204, delays 206, or could also include changes to flight numbers, and/or cancellations. It is contemplated that the system will monitor changes that would impact the ability to connect the ordered items with the user.

Changes to menus or ordered items as a result of the changes described above in connection with steps 204, 206, or any of the other described complications, follow the process as described above in connection with changes to the menu 198.

Once the items that have been ordered are delivered to the flight, the travel processing system 20A notifies 208 the order processing system 40A. The system then can proceed to send 210 a notification to the user that the items have been delivered and can thank the user for using the Ordering App.

In another configuration of the system, a user can utilize the Ordering App to see inventory availability and place live orders for the product (food, headsets, blankets, duty-free, etc.). These orders populate the flight attendant portal and trigger delivery from the flight attendant to the seat assignment. Inventory availability is achieved by Wi-Fi connection to a live bin server, which detects the items stored within a "smart" bin/cart using Bluetooth connectivity or other wireless communication method.

Once items are removed for the bin, the inventory system update immediately, reducing availability in the app.

The bin system will communicate with the Ordering App, which will then push content to the infotainment system to advertise the availability of excess items on board, with a live tracker of availability. The Ordering App will be able to accept further live orders, populated them to the flight attendant portal, and trigger delivery from the flight attendant to the seat assignment.

In one configuration, the Ordering App can allow the user the purchase items before they board the flight. In another configuration, the Ordering App can connect to the on-board inventory via the plane's Wi-Fi for purchase in-flight.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An order processing method for provisioning a carrier vehicle with items to be delivered to a user during a travel event, the method including the steps of:
    transmitting user data and travel event information relating to the user for a specified travel event from a user device to an order processing computer;
    presenting a list of items available for purchase to be delivered to the user during the specified travel event on the user device;
    transmitting a list of selected items from the list of items from the user device to the order processing computer;
    transmitting the user data, the travel event information and the selection of items from the order processing computer to an order fulfillment computer;
    transmitting a confirmation of the selected items to the user device for the specified travel event;
    generating a provisioning list of items to be provisioned on the carrier vehicle for the travel event with a travel processing computer in communication with the order processing computer, the provisioning list based on an estimated calculation accounting for the number of passengers scheduled for the travel event and based on the selection of items, wherein the estimated calculation is automatically reduced based on the selection of items;
    determining with the order processing computer prior to a date of the specified travel event whether the selection of items is available for delivery to a carrier of the specified travel event, wherein, if a selected item is unavailable for delivery, notifying the user via the user device that the selected item is not available for delivery during the specified travel event;
    modifying the provisioning list in real time with the travel processing computer based on the availability or selection of items;
    receiving a list of items delivered to the carrier vehicle in real time by an attendant mobile device along with at least some of the user data and the travel event information;
    maintaining a list of items in inventory updated in real time on board the carrier vehicle for selection and purchase during the travel event via wireless inventory tracking;
    presenting the list of items currently in inventory on board the earner vehicle to the user device during the travel event, and
    automatically updating the list of items in inventory in real time when items are purchased and/or removed from inventory during the travel event.

2. The order processing method according to claim 1, wherein when the user is notified that a selected item is not available for delivery during the specified travel event, the method further comprises the steps of:
    presenting the user with an alternate list of items available for purchase and delivery for the travel event on the user device;
    transmitting a confirmation of selected items from the alternate list of items available for purchase to the user device from the mobile device to the order processing computer; and
    modifying the provisioning list with the travel processing computer based on data relating to the selected items from the alternate list of items.

3. The order processing method according to claim 1, wherein the specified travel event is an airline flight.

4. The order processing method according to claim 1, wherein the selected items to be delivered to the user device during the specified travel event comprises perishable food items.

5. The order processing method according to claim 1, wherein the step of generating the provisioning list comprises removing the user from the number of passengers used for the estimated calculation.

6. The order processing method according to claim 1, further comprising the steps of:
transmitting a notification from the attendant mobile device to the order fulfillment computer that a selected item has been delivered to the user; and
transmitting a confirmation from the order fulfillment computer to the user device that the selected item has been delivered.

7. The order processing method according to claim 6, wherein the notification comprises data obtained from scanning the selected item with the attendant mobile device.

8. The order processing method according to claim 1, wherein the items delivered to the carrier vehicle each includes a wireless data device such that they are wirelessly coupled to a wireless reader positioned on a bin/cart when the items are placed into the bin/cart; and
wherein the items placed into the bib/cart are listed on an inventory list associated with the bin/cart; and
wherein upon removal of one of the selected items to be delivered from the bin/cart, a time and date of removal is automatically measured with the wireless reader and is saved on a storage associated with the bin/cart.

9. The order processing method according to claim 1, wherein the user device comprises a mobile device coupled to a wireless network.

10. An order processing system for provisioning a carrier vehicle with items to be delivered to a user during a travel event comprising:
an order processing computer having a storage and coupled to a network;
software executing on a user device coupled to the network and transmitting user data and travel event information relating to the user for a specified travel event to said order processing computer;
software executing on said order processing computer transmitting a list of items available for purchase associated with the specified travel event to the user device;
the software executing on the user device presenting the list of items available for purchase to be delivered to the user during the specified travel event;
the software executing on said order processing computer receiving a selection of items from the list of items for purchase from the user device;
the software executing on said order processing computer transmitting the user data, the travel event information and the selection of items to an order fulfillment computer connect to the network;
the software executing on the order processing computer transmitting a confirmation of the selected items to the mobile device;
the software executing on said order processing computer transmitting the user data, the travel event information and the selection of items to a travel processing computer connected to the network;
software executing on the travel processing computer generating a provisioning list of items to be provisioned on the carrier vehicle for the travel event, the provisioning list based on an estimated calculation accounting for the number of passengers scheduled for the travel event and based on the selection of items, wherein the estimated calculation is automatically reduced based on the selection of items;
the software executing on the travel processing computer transmitting the provisioning list to an order fulfillment computer; and
wherein an attendant mobile device receives a list of items delivered to the carrier vehicle associated with the specified travel event, the attendant mobile device further receives at least some of the user data and the travel event information;
the software executing on the order processing computer maintaining a list of items in inventory updated in real time on board the carrier vehicle for selection and purchase during the travel event via wireless inventory tracking;
the user device presented with the list of items currently in inventory on board the carrier vehicle during the travel event; and
the software executing on the order processing computer automatically updating the list of items in inventory in real time when stems are purchased and/or removed from inventory during the travel event.

11. The order processing system according to claim 10, wherein the attendant mobile device transmits data to said order fulfillment computer and said order processing computer that a selected item has been delivered to the user, wherein:
said order processing computer transmits a confirmation to the user device that a selected item has been delivered.

12. The order processing system, according to claim 11, wherein the data that is transmitted from the attendant mobile device to order fulfillment computer comprises data obtained from scanning a selected item with the attendant mobile device.

13. The order processing system according to claim 11, wherein the list of items delivered to the carrier vehicle each include a wireless data device such that they are wirelessly coupled to a wireless reader positioned on a bin/cart when the items are placed into the bin/cart; and
wherein the items placed into the bin/cart are listed on an inventory list associated with the bin/cart; and
wherein upon removal of one of the selected items to be delivered from the bin/cart, a time and date of the removal of the item is automatically measured with the wireless reader and is saved on a storage associated with the bin/cart.

14. The order processing method according to claim 8, wherein the data that is transmitted from the attendant mobile device to the order fulfillment computer comprises data that the item is removed from a bin/cart.

15. The order processing system according to claim 13, wherein the data that is transmitted from the attendant mobile device to the order fulfillment computer comprises data that the item is removed from a bin/cart.

16. An order processing method for provisioning a carrier vehicle with items to be delivered to a user during a travel event, the method including the steps of:
transmitting user data and travel event information relating to the user for a specified travel event from a user device to an order processing computer;

presenting a list of items available for purchase to be delivered to the user during the specified travel event on the user device;

transmitting a list of selected items from the list of items from the user device to the order processing computer;

transmitting the user data, the travel event information and the selection of items from the order processing computer to an order fulfillment computer;

transmitting a confirmation of the selected items to the user device for the specified travel event;

generating a provisioning list of items to be provisioned on the carrier vehicle for the travel event with a travel processing computer in communication with the order processing computer, the provisioning list based on an estimated calculation accounting for the number of passengers scheduled for the travel event and based on the selection of items, wherein the estimated calculation is automatically reduced based on the selection of items;

determining with the order processing computer prior to a date of the specified travel event whether the selection of items is available for delivery to a carrier of the specified travel event, wherein, if a selected item is unavailable for delivery, notifying the user via the user device that the selected item is not available for delivery during the specified travel event;

modifying the provisioning list in real time with the travel processing computer based on the availability or selection of items;

receiving a list of items delivered to the carrier vehicle in real time by an attendant mobile device along with at least some of the user data and the travel event information;

wirelessly coupling each item of the list of items delivered to the carrier vehicle to a wireless reader that reads a wireless data device on each item, the wireless reader positioned on a bin/cart in which the items are placed;

listing each item wirelessly coupled to the wireless reader on an inventory list associated with the bin/cart; and updating the inventory list in real time as items are removed from the bin/cart, including automatically saving a time and date of removal of the item on a storage coupled to the wireless reader.

17. The order processing method according to claim 16, wherein the wireless reader comprises a central processing unit, a transceiver and an antenna.

* * * * *